United States Patent [19]
Burke

[11] 3,853,291
[45] Dec. 10, 1974

[54] EXPLOSION-PROOF POLE BASE MEANS

[76] Inventor: Errol J. Burke, 409 Fillmore Ave., New Orleans, La. 70124

[22] Filed: Aug. 27, 1973

[21] Appl. No.: 392,067

[52] U.S. Cl.................. 248/158, 52/298, 174/50, 220/88 R
[51] Int. Cl............................................ F16m 13/00
[58] Field of Search...... 248/158, 346; 52/292, 298; 220/88; 174/50

[56] References Cited
UNITED STATES PATENTS

| | | | |
|---|---|---|---|
| 1,696,288 | 12/1928 | Underwood | 52/298 |
| 2,470,050 | 5/1949 | Petterson | 220/88 R |
| 2,807,755 | 9/1957 | Thayer et al. | 220/88 R |
| 2,816,678 | 12/1957 | Pomon | 220/88 R |
| 3,311,333 | 3/1967 | Galloway | 52/298 |
| 3,343,322 | 9/1967 | Lurkin et al. | 52/298 |
| 3,563,502 | 2/1971 | Dayson | 52/298 |

FOREIGN PATENTS OR APPLICATIONS 1,296,246  5/1969  Germany .................... 174/50

*Primary Examiner*—Marion Parsons, Jr.
*Attorney, Agent, or Firm*—Pugh & Laiche

[57] ABSTRACT

The present invention pertains to an explosion-proof pole base member for use with fabricated light pole or utility pole assemblies. More specifically, the instant invention provides an explosion-proof pole base means of a very functional design having a main structural housing portion, a handhole cover portion whereby access is readily gained to the main housing portion for splicing wires connecting the utility pole lighting fixture to the source of electricity, and a base plate portion for mounting the base means to appropriate sub-structures. The present pole base means incorporates structural features which renders it explosion-proof.

2 Claims, 5 Drawing Figures

PATENTED DEC 10 1974

3,853,291

INVENTOR.
ERROL J. BURKE

BY PUGH & LAICHE

ATTORNEYS

EXPLOSION-PROOF POLE BASE MEANS

Reference to Related Application

This application is a substitute application for the previous application of the same name, Ser. No. 181,509, filed Sept. 17, 1971, heretofore abandoned by action of law against the intentions of applicant.

BACKGROUND OF THE INVENTION

The present invention is concerned with those arts pertaining to structural base members for supporting a light, signal, or telephone pole assembly.

There are numerous utility light pole bases available in the market today. However, they are generally designed for use with specific designs of utility pole standards. Moreover, the design of many of these pole bases are such that they are not suitable for use in a combustible atmosphere, viz. they are not explosion-proof. Poles to be used in areas with combustible gases, vapors and liquids must be made with conduit and conduit fittings welded and threaded together to form an equivalent of the explosion-proof pole base herein described. These and other problems are overcome by the present invention which provides pole base means of an explosion-proof design which can be employed with standard conduit fabricated into pole assemblies or stanchions whereby considerable economic advantages are realized in savings on both material and labor in the fabrication of utility pole standards incorporating the present pole base means which allows the use of standard galvanized electrical conduit as the stanchion.

SUMMARY

The present invention provides an explosion-proof pole base means which comprises a main structural housing portion which is an elongated hollow member having one of its ends provided with a female threaded portion adapted to receive standard electrical conduit means having a male threaded portion for connection to the hollow base portion. The other end of the hollow base portion is provided with an outwardly extending flanged portion. This portion is machined along its outer peripheral bottom surface which portion in turn is provided with a number of spaced apart mounting holes, as well as a number of drilled holes for connection to base plate means. The housing means is further defined in that it is provided with a handhold access opening in one of its sides. The peripheral portion around this opening is machined and provided with threaded holes for connecting handhold plate means thereto.

Base plate means are also provided which have a configuration and an upper machined surface adapted to operably mate with the machined bottom surface of the flanged portion of the housing means. These members are connected together by suitable bolting means via the drilled holes provided in the flanged portion of the housing means and threaded holes of the base plate. The base plate means is also provided with mounting holes along its peripheral surface which mate with the mounting holes provided in the flanged portion of the housing means. Moreover, the base plate means is also provided with threaded female conduit openings approximately in its center portion which are in open communication with the main base portion. In such manner, the present pole means can be operably connected to electrical conduit housing a source of electricity.

Handhole cover plate means are also provided of a design and having a machined surface adapted to mate with that provided in the side of the hollow base portion. The cover plate means is also adapted for connection to the base portion by suitable bolting means via the threaded holes provided in the base means. By such design, when the above components are assembled and operably connected to a light stanchion and to electrical supply conduit, an explosion-proof assembly is realized.

DESCRIPTION OF PREFERRED EMBODIMENT

Figure 1:
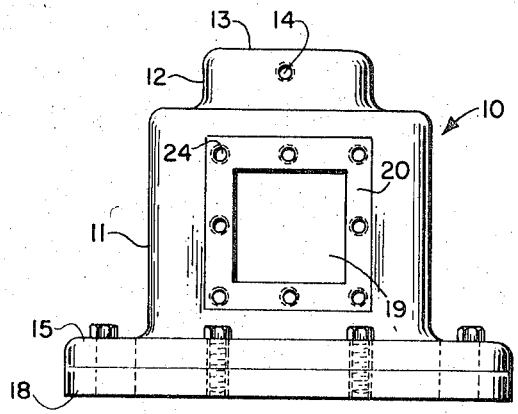
FIG. 1 in the drawing represents a side elevational view of the present pole base means taken from the side thereof on which the handhole access opening is positioned.
Figure 3:
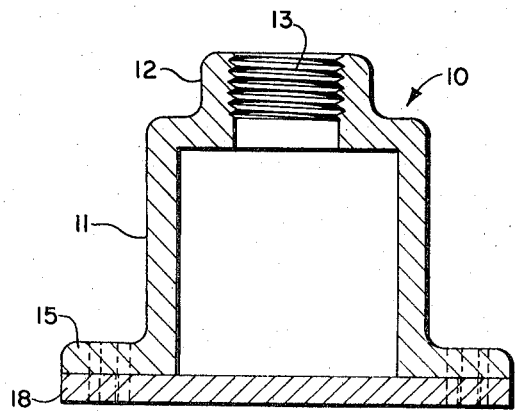
FIG. 3 depicts a cross sectional view of the present box means taken along the line A-A of FIG. 2.

Referring to FIG. 1 in the drawing, the explosion-proof pole base means 10 comprises the hollow base portion 11 which is preferably essentially square in design. The hollow portion generally measures about 4 inches by 4 inches. The top end or portion 12 of the base portion 11 is preferably narrowed or swaged down to define the threaded portion 13, as shown in greater detail in FIG. 3 of the drawing. The threaded portion 13, is preferably provided with standard tapered threads, preferably to receive two inch electrical conduit.

The threaded hole 14 is provided and adapted to receive a standard set screw whereby the pole or conduit stanchion can be locked in position and prevented from turning.

Figure 2:
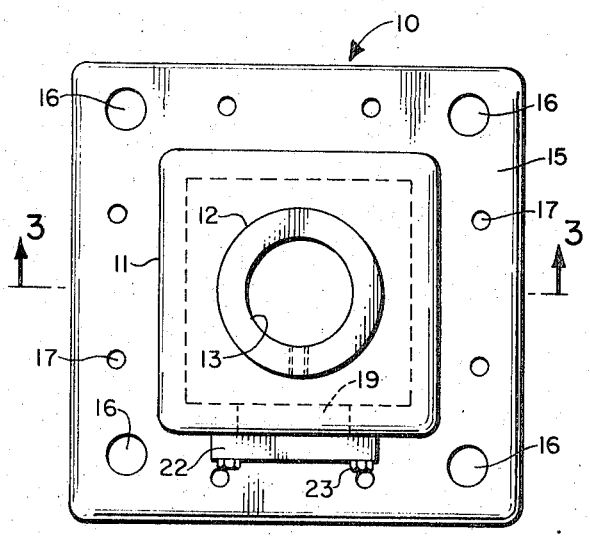
FIG. 2 represents a plan view of the assembly of FIG. 1.

The bottom end of the base portion 11 is provided with the outwardly extending flanged portion 15 which as shown in the plan view of FIG. 2, is provided with the series of mounting holes 16 for securing the assembled pole base to a concrete pedestal or to the steel superstructure of a platform.

The series of drilled holes 17 are also provided in the flanged portion 15 whereby the base plate means 18 can be readily bolted to the flanged portion 15. The outer peripheral top surface of the base plate 18 and the bottom surface of the flanged portion 15 are machined over a suitable width so as to define an explosion-proof joint. In other words, these members are designed to mate very closely so as to prevent or at least minimize the influx of a combustible atmosphere to within the hollow chamber defined by the base portion 11. Conversely, the wall thickness of the present explosion-proof pole base means relative to its materials of construction is determined such that it is capable of withstanding an internal explosion in the event that combustible gases are ignited by an electrical spark inside of the base means. In such event, the tightness of the seal and width at the machined surface defined between the flanged portion 15 and the base plate 18 is such that any gas escaping from the base as a result of an internal explosion will be sufficiently cooled when it reaches the outside atmosphere. In this manner, such gas cannot ignite the outside atmosphere if in the event the outside atmosphere is combustible. It can be appreciated that the thickness of the walls which must be made capable of withstanding the internal pressure resulting from an explosion without bursting and without loosening of the joints is primarily a matter of selection of the materials of construction and design.

It is to be pointed out that explosion-proof equipment is not necessarily gas tight since it is impractical, if not impossible, to realize an entirely gas-tight wiring system. Accordingly, to meet the requirement of being explosion-proof, it is not necessary that an enclosure be gas tight, but rather, that it be designed and manufactured of sufficient strength such that it will contain an explosion and thereby prevent the escape of flame or heat which might in turn ignite the surrounding atmosphere. Thus, the objective is not to entirely prevent the escape of burned gases from a piece of explosion-proof equipment, but rather, to define an escape path such that the temperature of the escaping gas when it reaches the outside of the enclosure is below the ignition temperature of the surrounding atmosphere.

As can be seen in FIGS. 1 and 2, one side of the hollow base portion 11 is provided with the access handhole opening 19 whereby conductors in the light standard can be spliced or connected to the source of electricity. Thus, the pole base serves as a junction box and a pull point for connection of the conductors serving the light fixture and the source of electricity. Additionally, the pole base serves as a pull point for conductors supplying other lighting stanchions, as well as its primary purpose of supporting a given lighting fixture stanchion. Around the opening on the outside of the base portion 11, there is provided the machined surface 20 adapted to mate with a similar machined surface 21 as provided on the handhole access cover plate member 22. Thus, the handhole cover 22 is of a sufficient size to cover the opening 19 in the hollow base portion 11 and the machined surface about the opening. The machined surface 21 on the inside of the cover 22 is of the same width such that upon the closure of the two members, an explosion-proof joint is realized. The cover plate 22 is provided with a series of holes adapted to receive the bolted means 23, the threaded holes 24 being provided in the hollow base portion 11 for affixing the cover plate 22 thereto. Similarly as in the case of affixing the cover plate 18 to the flanged portion 15 of the base member 11, the width of the seal between the base portion 11 and the access cover plate 22 is sufficient to cool any gas that might escape to the outside in the event of an internal explosion within the member 11.

Figure 4:
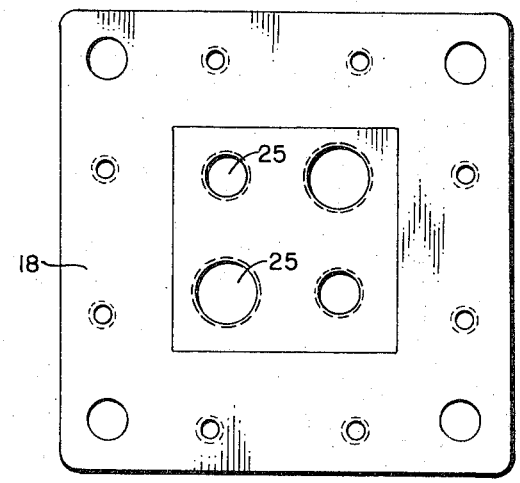
FIG. 4 depicts a plan view of the base plate means alone.
Figure 5:
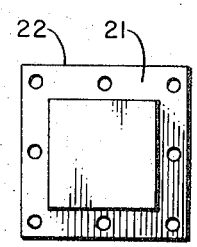
FIG. 5 represents a side elevational view of the handhole cover plate means similarly as shown in FIG. 1 in an assembled relationship to the main base portion of the present pole means.

As shown in FIG. 4, the base plate 18 is provided with a number of threaded openings 25 to which electrical conduit is connected carrying the conductors providing a source of electricity to the light fixture. The minimum thickness of the base plate 18 should be sufficient to allow at least about 5 conduit threads to be fully engaged. The conduit to base connection forms an explosion-proof joint. In the event of an internal explosion, a threaded connection with five (5) threads fully engaged, like a machined surface, provides a path between the threads such that by the time the escaping gas reaches the outside of the enclosure it has cooled sufficiently so that the gas does not ignite the exterior atmosphere.

In light of the foregoing detailed disclosure, it can be appreciated that the present explosion-proof pole base means will find diverse application in chemical plants, refineries, and other similar production facilities and that diverse revisions can be made in its design without departing from the true scope and spirit of the present invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. An explosion-proof pole base comprising:
  a. housing means comprising an elongated hollow base portion having one of its ends provided with a female threaded portion adapted to receive pole means provided with a male threaded portion whereby an explosion-proof connection is realized between said housing means and the pole means when operably connected thereto;
  and its other end defining an outwardly extending flanged portion machined along its outer peripheral bottom surface, which flanged portion is provided with a number of spaced apart mounting holes and drilled holes for connection to base plate means as hereinafter defined; and
  b. base plate means of a configuration and having an upper machined surface adapted to operably mate with the machined bottom surface of the flanged portion of said housing means for connection thereto by suitable bolting means via the drilled holes provided in the flanged portion of said housing and the threaded holes in said base plate whereby said means when operably bolted together form an explosion-proof joint;
  said base plate means also being provided with mounting holes along its peripheral surface which mate with the mounting holes provided in the flanged portion of said housing means;
  said base plate means also being further defined in that threaded female conduit openings are provided in its center portion in open communication with said hollow base portion.

2. The explosion-proof pole base means of claim 1 is further defined in that:
  said housing means being further defined in that it is provided with a handhold access opening in one of its sides, the peripheral portion around the opening being machined and provided with threaded holes for connection to handhold plate means as hereinafter defined; and
  c. handhold cover plate means of a configuration and having a machined surface adapted to mate with that provided in the side of said hollow base portion;
  said cover plate means being adapted for connection to said base means by suitable bolting means via the threaded holes provided in the housing means, whereby said means when operably bolted together form an explosion-proof joint.

* * * * *